March 12, 1968

H. V. HANSEN 3,372,657

MINIMUM TILLAGE APPARATUS

Filed April 6, 1964

INVENTOR.
HAROLD V. HANSEN
BY
*John C. Thompson*
ATTORNEY

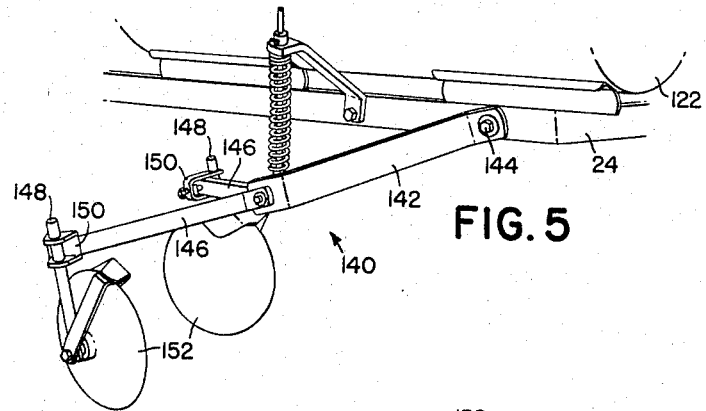
FIG. 5
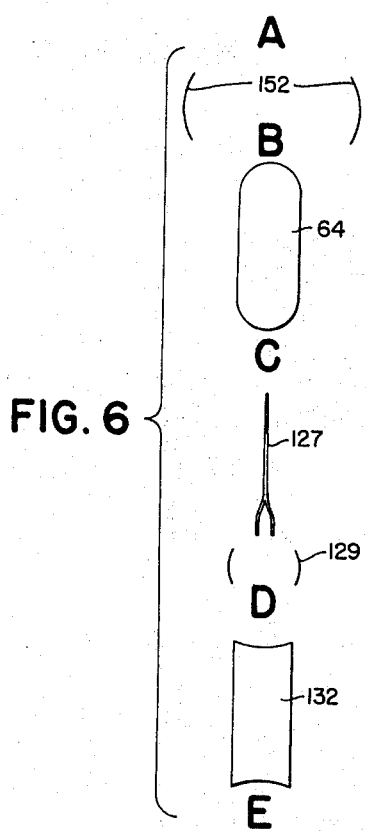
FIG. 6
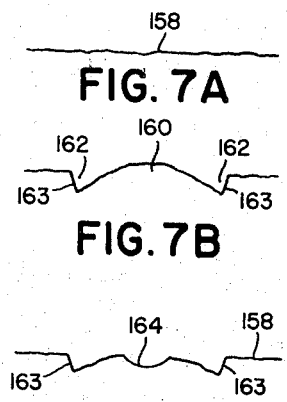
FIG. 7A
FIG. 7B
FIG. 7C
FIG. 7D
FIG. 7E
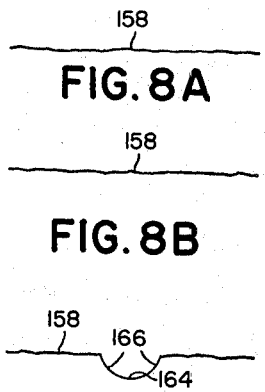
FIG. 8A
FIG. 8B
FIG. 8C
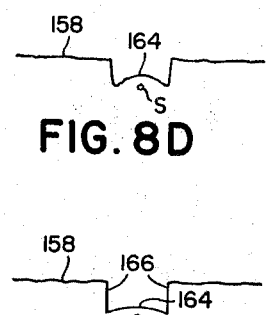
FIG. 8D
FIG. 8E
INVENTOR.
HAROLD V. HANSEN
BY
ATTORNEY

United States Patent Office 3,372,657
Patented Mar. 12, 1968

3,372,657
MINIMUM TILLAGE APPARATUS
Harold V. Hansen, Hillsdale, Ill., assignor to Deere & Company, Moline, Ill., a corporation of Delaware
Filed Apr. 6, 1964, Ser. No. 357,522
12 Claims. (Cl. 111—1)

The present invention relates generally to agricultural implements and more particularly to units for preparing a seed bed and planting seed therein.

The object and general nature of the present invention is the provision of a minimum tillage implement in which the seed bed is completely prepared and planted in one operation. More specifically, it is an object of the present invention to provide a new and improved plow-plant unit in which a field may be planted as it is plowed.

Another object of the present invention is to provide a wheel track planter attachment which is securable behind a conventional plow.

Another object is the provision of a wheel track planter attachment which is adapted to be secured to a plow in such a manner that the wheel track planter unit can swing about a generally fore-and-aft axes relative to the plow.

Another object of the present invention is to provide a wheel track planting unit which is adapted to be secured to a semi-integral plow having a steerable rear furrow wheel, in which the track forming means of the wheel track planting unit is interconnected with the steering linkage of the rear furrow wheel of the plow so as to be steerable therewith.

Another object of the present invention is to provide a tool bar on a wheel track planting unit to which unit planters may be secured, and also to provide means to raise and lower the tool bar relative to the wheel track unit frame.

Another object is the provision in a wheel track planting unit of forwardly extending draft means having substantially parallel upper and lower links and a forward mast, the mast being securable in draft engaging relationship with a plow or similar implement, the parallel links maintaining the rear frame of the wheel track unit in substantially the same spacial relationship to the ground surface as the front of the unit moves up and down relative to the rear frame of the unit.

Another object of the present invention is to provide an improved method and apparatus for preparing the soil when planting in wheel tracks.

These and other objects and advantages of the present invention will be apparent to those skilled in the art after a consideration of the following detailed description, taken in conjunction with the accompanying drawings in which the preferred form of this invention is illustrated.

FIG. 5 is a perspective view showing the manner in which disk ridgers are secured to the apparatus whereby ridges may be formed in advance of the soil compacting wheels.

FIG. 6 is a schematic plan view showing the soil working devices associated with the planting apparatus of this invention.

FIGS. 7A to 7E show various soil profiles when a disk ridger is employed.

FIGS. 8A to 8E show various soil profiles corresponding to FIGS. 7A to 7E when the prior art soil cultural practices are employed.

In the following description right-hand and left-hand reference is determined by standing to the rear of applicant's plow-plant unit and facing the direction of travel.

Figure 1:
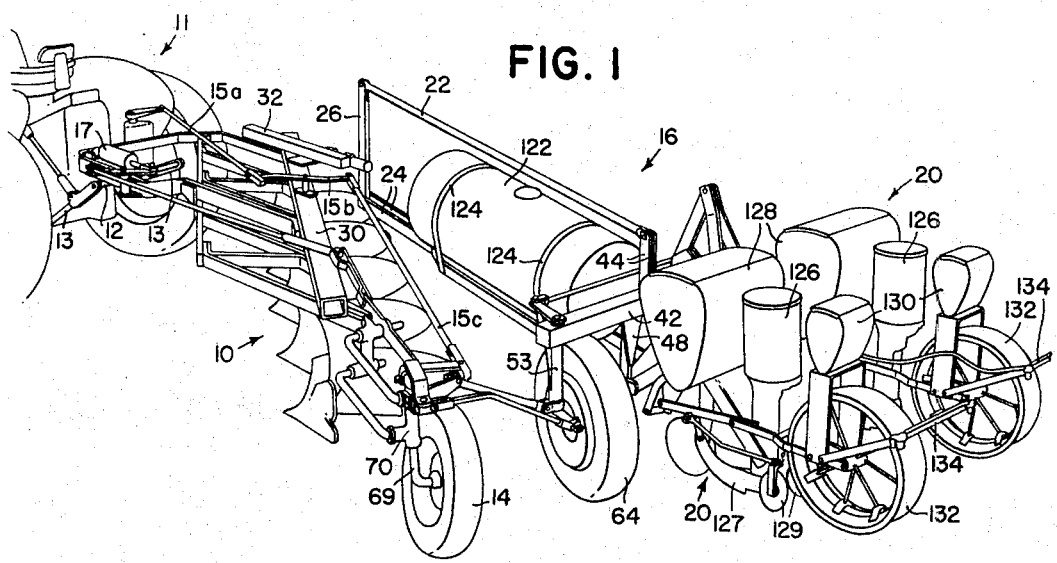
FIG. 1 is a perspective view of a plow-plant unit in which the principles of the present invention have been incorporated, the plow and planters being shown in their transport position.

The minimum tillage apparatus of the present invention, as best shown in FIG. 1, comprises a plow, indicated generally at 10, which is adapted to be drawn by a farm tractor 11 having two independent hydraulic circuits for controlling remote cylinders, and a wheel-track planter which includes a wheel-track trailer unit 16 and two unit planters 20. The plow is provided with a cross bar 12 at its forward end which is secured to the lower draft links 13 of the tractor three-point hitch. The plow is also provided with a steerable rear furrow wheel 14 which is interconnected with the crossbar 12 through linkage 15a, 15b, and 15c and is steerable in response to swinging movement of the cross arm 12 relative to the main body of the plow. A remote cylinder 17 is employed to raise and lower the rear furrow wheel, and is controlled by one of the two tractor hydraulic circuits. In that this type of plow is well known in the art, it is not felt that discussion of the details of the plow is warranted.

Figure 4:
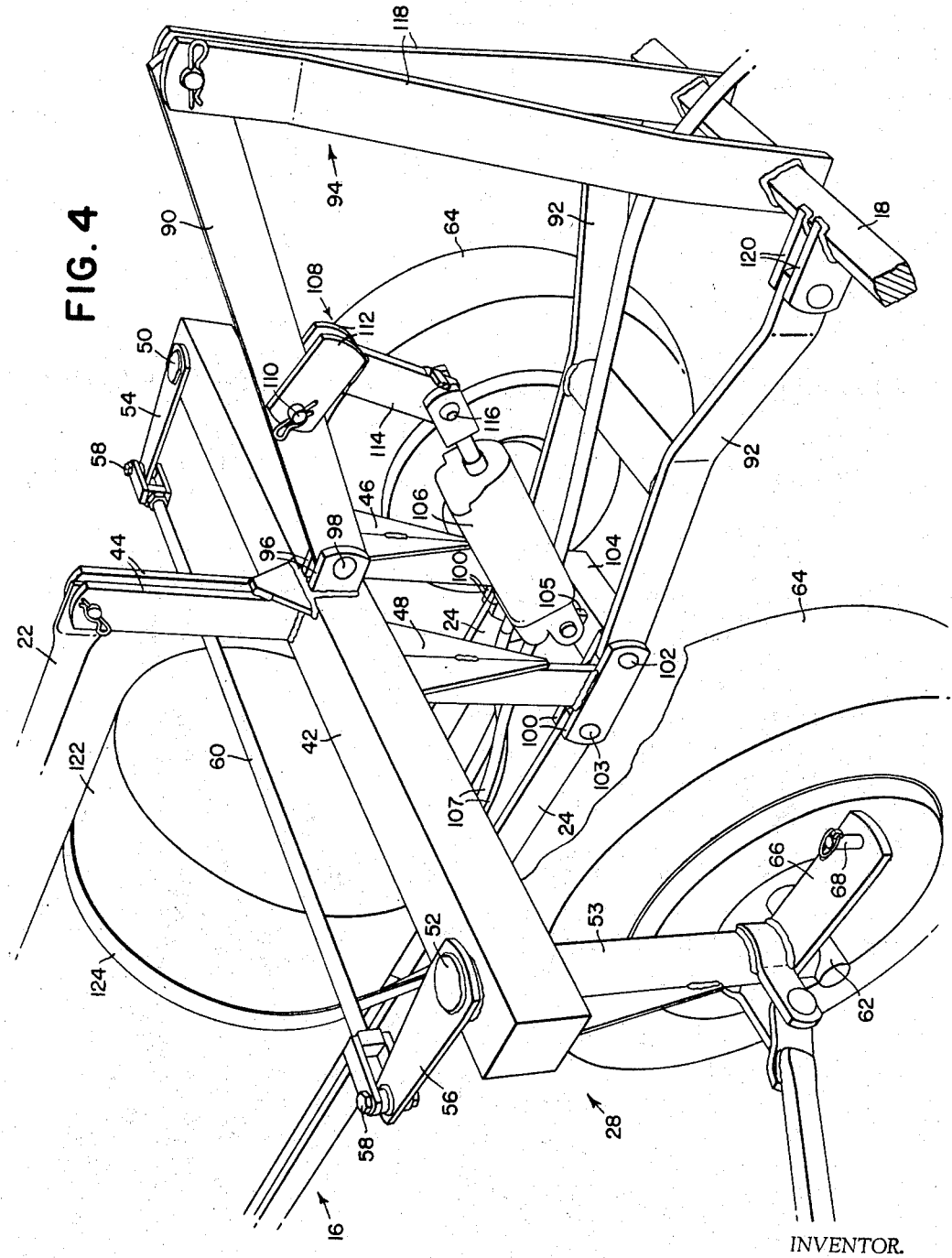
FIG. 4 is an enlarged perspective view showing a portion of the wheel track forming unit.

The wheel-track trailer 16 is secured to the main frame 30 of the plow, and the trailer includes a tool bar 18 (FIG. 4) to which the unit type planters 20 may be secured. The planters may be of the type illustrated generally in the Sorensen et al. Patent No. 3,023,718. The wheel track trailer 16 has forwardly extending upper and lower draft links 22 and 24, respectively, which are pivotally secured at their forward ends to a mast 26, and the links are secured at their rear ends to the main frame, indicated generally at 28 (FIG. 4), of the trailer unit.

Figure 3:
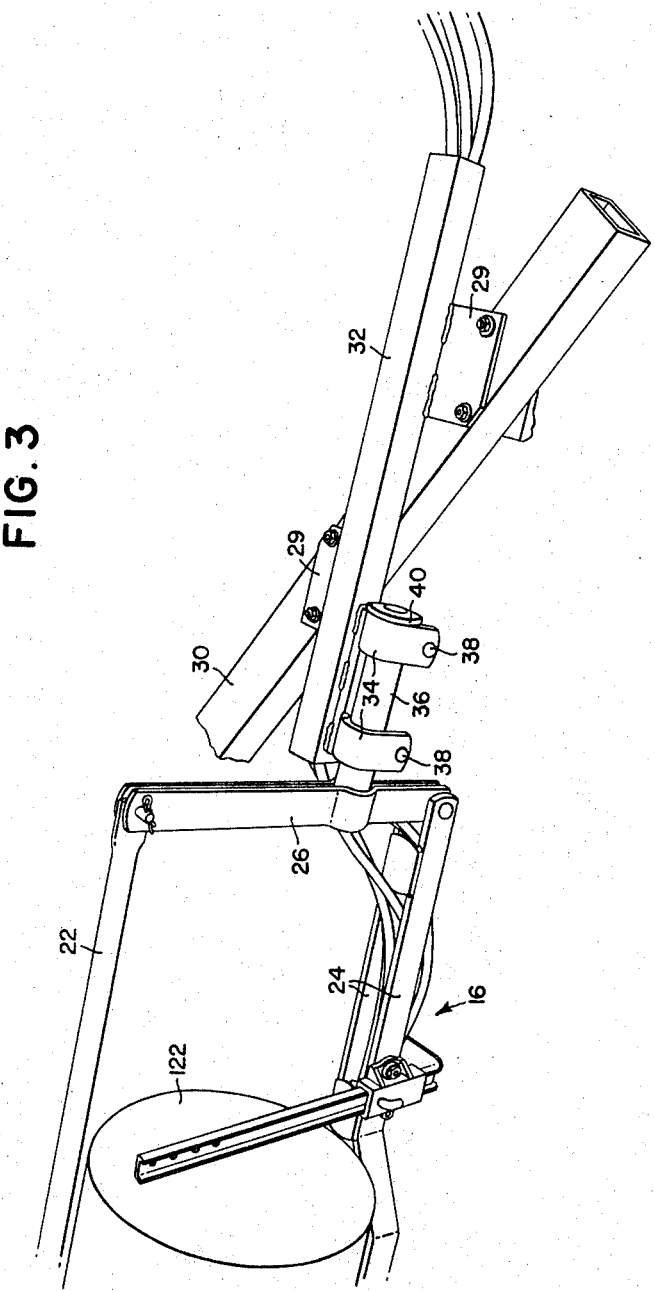
FIG. 3 is an enlarged perspective view showing the forward connection between the main frame of the plow and the wheel track forming unit.

Secured by brackets 29 to the main frame 30 (FIG. 3) of the plow 10 is a fore-and-aft extending frame member 32 having secured to one side a rearwardly extending portion that includes U-shaped members 34. Secured to the mast 26 is a forwardly extending shaft member 36 which is adapted to be disposed between the legs of the U-shaped members 34 and to be held therein by pins 38. Rigidly secured to the forward end of the rod 36 is a circular plate 40 which prevents the shaft 36 from sliding rearwardly through the U-shaped members.

The main frame 28 of the trailer 16 includes a transverse frame member 42 (FIG. 4) having rigidly secured thereto two closely spaced together central upstanding members 44, which are adapted to pivotally receive therebetween the upper link 22, and two generally centrally disposed depending members 46 and 48, the lower draft links 24 being pivotally secured to the depending members 46 and 48 in a manner more fully set forth below.

Journaled within opposite ends of the transverse frame member 42 for rotational movement about generally vertically extending axes are right and left spindles 50 and 52 respectively, the lower intermediate portions of the spindles being confined within sleeves 53. Secured to the upper ends of the spindles are right- and left-hand forwardly projecting arms 54 and 56, respectively, carrying at their forward ends bolts 58 which in turn pivotally carry a transverse tie rod 60. Secured at the lower ends of the spindles 50 and 52 are stub axles 62 which rotatably carry thereon wheels 64 which are used to form the wheel tracks in which the planting is done.

Figure 2:
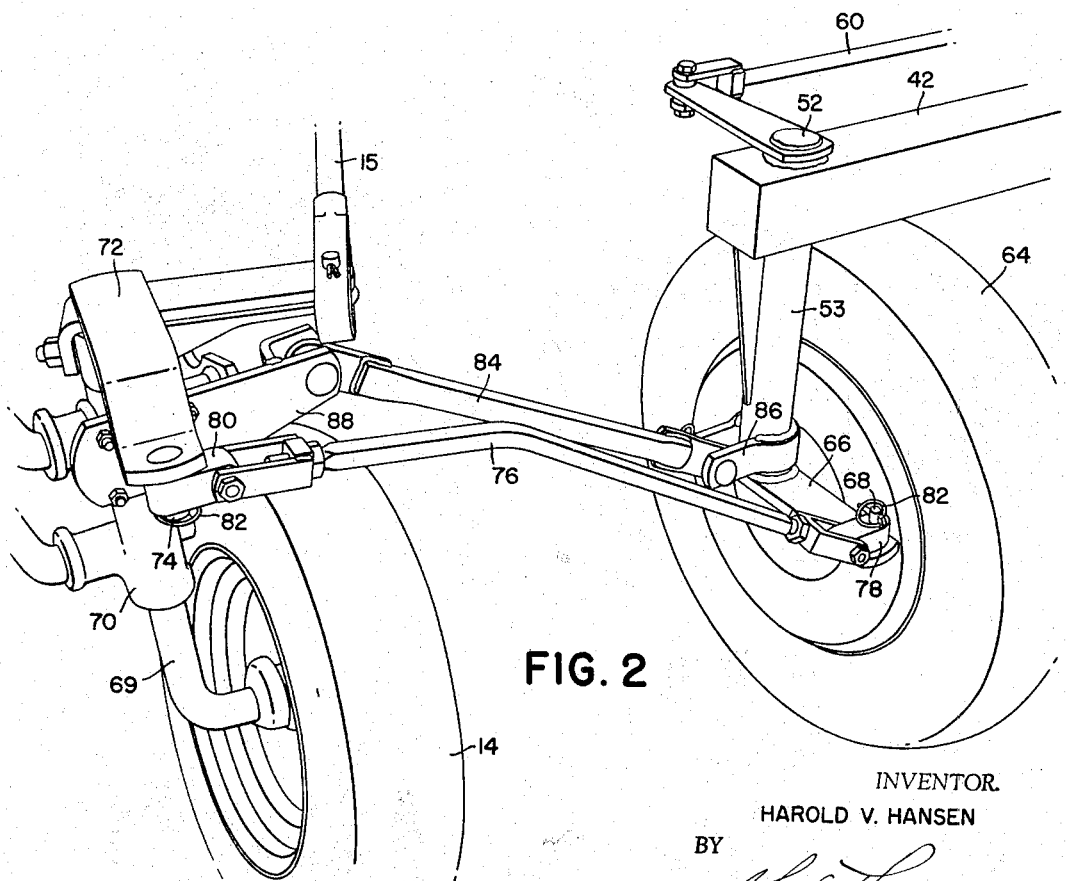
FIG. 2 is an enlarged perspective view showing the connection between the steerable rear furrow wheel of the plow and the steerable wheel track forming means of the wheel track unit.

Extending rearwardly from the left spindle 52 (FIG. 4) is an arm 66 to which is rigidly secured an upstanding pin 68. The steerable rear furrow wheel 14 (FIG. 1) of the plow is journaled for rotation on the main frame of the plow about a generally vertical axis defined by a spindle 69 which is disposed within a sleeve 70 carried by the plow. Secured to the upper end of the spindle 69 is a rearwardly projecting arm 72 (FIG. 2) to which is rigidly secured a depending pin 74. Disposed between the pins 68 and 74 is a rod 76 having right- and left-hand pivot blocks 78 and 80, respectively, which are held on the pins 68 and 74 by means of fasteners 82.

Movement of the furrow wheel about the axis defined by the sleeve 70 will cause a corresponding movement of the wheels 64 due to the tie link 76. It should be noted that other forms of tie links may be employed. Thus the wheels 64 might be steered by a link extending from the junction of links 15a and 15b to an arm extending to the left from the upper end of the spindle 52. A link 84 is mounted between the sleeve 53 of the wheel track trailer and the sleeve 70 of the plow, the link being pivotally secured at its right end (FIG. 2) to a bracket 86 rigidly secured to one side of the sleeve 53, and pivotally secured at its left end to a bracket 88 that is rigidly secured to one side of the sleeve 70. The link maintains the tail wheel of the plow and the unit 16 in the proper spaced apart relationship.

Pivotally secured to the rear of the main frame 28 of the trailer 16 are upper and lower links 90 and 92 (FIG. 4), respectively, to which at the rear ends thereof is secured a mast 94 that in turn carries the tool bar 18. The upper link 90 is pivotally secured at its forward end to rearwardly projecting lugs 96 by means of a pin 98, the lugs 96 being secured in turn at their forward ends to the transverse frame member 42. The lower links 92 are secured to the rearward portion of fore-and-aft extending plate members 100 by means of pivot pins 102, the plate members 100 being in turn rigidly secured to the arms 46 and 48. The lower draft links 24 are pivotally secured to the forward portion of the plate members 100 by means of pins 103.

Disposed between the inner plate members 100 is a transverse member 104 having an upwardly projecting lug 105 to which is secured one end of a hydraulic cylinder 106, fluid lines 107 connecting the cylinder 106 with the other of the two tractor remote hydraulic circuits. A link unit, indicated generally at 108, is pivotally secured to the upper link 90 by means of a pivot pin 110 which passes through apertured side members 112 of the link member 108. The lower central member 114 of the link unit 108 is rigidly secured to the side members 112 and is adapted to abut against the upper link 90, the member 114 being apertured at its lower end to receive a pin 116 which secures one end of the hydraulic cylinder 106 to the unit 108. The mast 94 (FIG. 4) includes generally vertically extending members 118 which are pivotally secured at their upper ends to the upper link 90, and are rigidly secured at their lower ends to the tool bar 18. The tool bar in turn is rigidly secured to apertured lug means 120 which are in turn pivotally secured to the rearward ends of the lower links 92.

Carried on the lower draft links 24 is a tank 122 (FIGS. 1 and 4) which is adapted to carry herbicide material, the tank being secured to the draft links 24 by suitable strap means 124.

The unit type planters 20 are secured to the tool bar 18 in such a manner that as the tool bar 18 is raised or lowered, the planters will similarly be raised and lowered, as for example, in the manner shown in the above referred to Sorensen patent. The unit planters are disposed directly behind the wheels 64 whereby they may plant in the soil firmed by the wheels. The unit type planters may be equipped with the usual seed cans 126, furrow openers 127, and fertilizer distributing mechanism 128, and also with furrow filling devices 129, and insecticide distributing mechanism 130. As best shown in FIG. 1, mounted above and to the rear of the press wheels 132 are spray booms 134 through which herbicide material received from the tank 122 in any suitable way may be sprayed.

In applicant's preferred embodiment, a five-bottom plow having sixteen-inch bottoms is employed. The wheels 64 are preferably spaced forty inches apart, as is generally conventional for planting corn, and are disposed centrally behind the plow 10. Since the planters 20 are mounted directly behind the wheels 64, they will also be preferably spaced 40" apart. Thus, as the plow is drawn across the field by the tractor 12, an eighty-inch strip of ground will be plowed by the plow 10, two strips of ground 40 inches apart will be compacted by the wheels 64, and the plowed and compacted ground, or wheel tracks, will be fertilized through means of the fertilizer distributing mechanism 128, planted in two rows spaced forty inches apart, and otherwise treated, as may be desired, as for example, by applying insecticide and herbicide material. When the next pass is made by the tractor another eighty inches will be worked and two more rows will be planted. It should be obvious that succeeding operations will successively cause all rows to be planted approximately forty inches apart.

By employing a semi-integral plow having a steerable rear furrow wheel and interconnecting the steering linkage of the rear furrow wheel of the plow with the track forming wheels of the trailer 16, the units will more closely follow the contour of the land, and sharper turns at the headlands may be accomplished than would be possible if the wheels were not steerable.

By mounting the unit planter carrying tool bar 18 in the manner indicated, namely by use of a three-point mechanism 90, 92, the planters may be raised and lowered independently of the plow as desired by operation of the hydraulic cylinders 17 and 106 which are connected to two independent sources of fluid under pressure on the tractor by the usual conventional hoses. Thus, in operation the front of the plow can be lowered by lowering the tractor three-point hitch, then the rear of the plow can be lowered by operation of the cylinder 17, and finally the planters can be lowered into plowed land by operation of the cylinder 106. Similarly the planter can be maintained in planting position at the end of the field even though the semi-integral plow has been raised.

To further facilitate the independent planting and plowing, the trailer 16 is secured to the plow by means of the parallel links 22 and 24. Thus the tool bar 18 will be held in the same angular relationship to the ground independently of the vertical movement of the mast 26. It should be noted that if the main frame 28 of the trailer were secured to the plow by a single link, then as the plow was raised and lowered relative to the main frame, the tool bar would be raised and lowered since the trailer unit would pivot about a transverse axis defined by the contact of the wheels with ground surface. Furthermore the engageable surfaces of the tool bar would be disposed in different angular relationship with respect to the ground surface.

A further feature of the present invention is the provision of disk hillers or ridgers 140 which, as can be seen from FIG. 5, are mounted on the lower draft links 24 for up and down swinging movement about a transverse axis. There is a pair of disk ridgers for each soil compacting wheel 64 and the disks are mounted in front of the wheels 64 so that the wheels 64 will run in the ridge formed by the disks. In applicant's preferred construction, each pair of disk ridgers includes a laterally offset link 142 secured at its forward end by means of pivot bolt 144 to one of the lower draft links 24. Rigidly secured to the rear end of the offset link 142 are two diverging arms 146 having spindles 148 secured thereto by clamping means 150. Ridging or hilling disks 152 are rotatably mounted on the lower ends of standards or spindles 148.

The advantages achieved by the employment of the disk ridgers 140 can best be appreciated from a consideration of FIGS. 7A to 7E which show soil profiles taken at various places when the disk ridgers 140 are employed and also from FIGS. 8A to 8E which show corresponding soil profiles when disk ridgers are not employed. FIGURES 7A and 8A show the soil profile after it has been plowed but without further treatment, the profile being a section taken transversely of the structure shown schematically in FIG. 6 at A. The soil at A is uncompacted and has a generally coarsely level surface indicated at 158.

FIGS. 7B and 8B show corresponding profiles at B (FIG. 6) where disk hillers are employed as in FIG. 7B and also when they are not as in FIG. 8B. As can be seen from FIG. 7B the disk ridgers cause the soil to be thrown up to form a ridge 160 in the central area of the soil worked by the disks 152, the soil forming the ridge 160 being taken from the sides 162 of the area worked by the disks. The disks 152 form a low slightly angled wall 163 at the edges of the worked area. In FIG. 8B the soil is shown having the same profile as in FIG. 8A since there has been no working of the soil between FIGS. 8A and 8B.

FIGS. 7C and 8C show corresponding profiles after the ground has been engaged by soil compacting wheels. The lower level 164 of the soil compacted by the wheels 64 is only slightly below the surface 158 where the disk ridgers are employed as can be seen in FIG. 7C while the level 164 is considerably below the surface 158 where disk ridgers are not employed as shown in 8C. This is so since the soil to be compacted by the wheel 64 is higher where the soil has previously been worked by the disk ridgers than in the embodiment which does not employ the ridgers. While the compaction is the same in either case, the resultant lower level 164 is higher where the soil engaged by the wheel was initially higher. Also it should be noted that where the disker is not employed relatively high, steeply sloped walls 166 are formed to either side of the track 164 as shown in FIG. 8C, these walls not being of a material height where the ridgers are employed as shown in FIG. 7C.

FIGS. 7D and 8D show corresponding profiles after the furrow has been opened by the furrow opener 127 the seed S placed therein and the furrow covered by the furrow coverers 129. It should be noted that the furrow coverer may be spaced further apart when a ridger is employed than when no ridger is employed.

FIGS. 7E and 8E shows the final configuration after the soil thrown over the seed S has been compacted by the press wheel 132. It can be seen that the land that has initially been engaged by the disk ridgers (FIG. 7E) has a substantially wider worked area (preferably in the neighborhood of 14″) which is substantially level and has no sharply defined walls near the seed, the slightly angled walls 163 formed by the disk hillers being both relatively low and remote. By contrast, the profile of the soil that has not been initially engaged by the disk hillers is such that the area worked is relatively narrow, and the substantially vertical walls 166 formed by the soil compacting wheel are both relatively high and close to the seed.

It should be noted that improved cultural results are achieved when the seed bed has the profile shown in 7E compared to that soil profile shown in 8E in which a ridge was not initially formed. The reasons are two-fold. First, the soil being relatively level is more receptive to the use of herbicides. It should be noted that the herbicide material will not stick to the substantially straight walls 166 and thus noxious plant life may be established in these walls in close proximity to the seed S. Thus the disk ridgers establish a better bed for the reception of herbicide material. The second reason why better results are achieved is that the soil to the sides of the walls 166 tend to crumble inwardly and cover up the seed in the furrow thus causing the seedling to penetrate a greater amount of soil than is desirable. It should be noted that if too much soil falls over the seed, the seedling will not be able to penetrate and thus no plant will be established.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

I claim:

1. An agricultural implement comprising: a semi-integral plow having a main frame, a cross bar shiftably secured forwardly of the main frame and adapted to be carried by the lower draft links of a tractor having a three-point hitch, a generally vertically extending first spindle means journaled for rotation on said main frame and carrying at its lower end a rear furrow wheel, linkage means interconnecting said cross bar and said first spindle means in such a manner that rotational shifting movement of said cross bar relative to the main frame will cause the first spindle means to be rotated, a wheel track planter unit having a draft frame secured to the main frame of said plow, said unit having generally vertically extending second spindle means journaled for rotation on said unit and carrying wheel track forming means, link means interconnecting said first and second spindle means in such a manner that when the first spindle means is rotated in response to shifting movement of said cross bar the second spindle means will be rotated in a like manner, and means interconnecting the plow and wheel track planter to maintain a proper spaced apart relation between said first and second spindle means.

2. The invention set forth in claim 1, in which said link means comprises a first arm extending outwardly from an upper portion of said first spindle, a second arm extending outwardly from said second spindle, said first and second arms being generally parallel, and rod means interconnecting the outer ends of said arms.

3. An agricultural implement comprising: a semi-integral plow having a main frame, a cross bar shiftably secured forwardly of the main frame and adapted to be carried by the lower draft links of a tractor having a three-point hitch, a generally vertically extending first spindle means journaled for rotation on said main frame and carrying at its lower end a rear furrow wheel, first linkage means interconnecting said cross bar and said first spindle means in such a manner that rotational shifting movement of said cross bar relative to the main frame will cause the first spindle means to be rotated, a wheel track planter unit having a transverse frame member, a draft frame having a forward portion secured to the main frame of the plow and a rearward portion secured to the transverse frame member, a pair of generally vertically extending second spindles journaled for rotation in said transverse frame member, each of said spindles having laterally projecting stub shafts secured to their lower ends, track forming wheels mounted for rotation on said stub shafts, second linkage means interconnecting said first linkage means and one of said second spindles in such a manner that when the first spindle means is rotated in response to shifting movement of said cross bar, the second spindle means will be rotated in a like manner, and means interconnecting the plow and the wheel track planter to maintain a proper spaced apart relation between said first and second spindle means.

4. A unit planter supporting frame comprising: a transverse main frame structure, a plurality of wheel track forming means carried by said transverse frame structure, a forwardly extending frame, and a rearwardly extending frame secured at its forward end to said transverse frame and carrying at its rear end a transverse tool bar to which unit planters may be secured, said forwardly extending frame comprising upper and lower parallel frame members pivotally secured at their rear ends to the traverse main frame structure, a forward mast pivotally secured at upper and lower portions to said upper and lower parallel frame members, and means secured to said mast and adapted to be rotatably connected to a ground-working implement.

5. A unit planter supporting frame comprising: a transverse main frame structure, a plurality of wheel track forming means carried by said transverse frame structure, a forwardly extending draft frame secured to said transverse main frame structure, and a rearwardly extending frame carrying at its rear end a transverse tool bar to which unit planters may be secured, said rearwardly extending frame including an upper compression link means pivotally secured at its forward end to the transverse frame, lower draft link means pivotally secured at its forward end to the transverse frame, and tool bar carrying means pivotally secured at its upper end to said compression link means and pivotally secured at its lower end to said draft link means.

6. The invention set forth in claim 5 in which extensible and retractable means are engageably disposed in operative relationship between the compression link and the transverse frame member.

7. The invention set forth in claim 4 in which said last-mentioned means comprises a forwardly extending cylindrical member which is adapted to be rotatably secured to said ground-engaging implement.

8. A method of planting comprising: forming a ridge in freshly worked soil at least the central portion of the ridge being at an elevation above the normal surface of the freshly worked soil, compacting the soil in the central portion of the ridge until it is no longer above the normal surface of the freshly worked soil, opening a furrow within the compacted soil, placing seed within said furrow, covering the furrow with soil, and pressing the soil over the furrow to form a good seed bed.

9. An agricultural implement comprising: a semi-integral plow adapted to be secured to a tractor for relative turning movement, a generally vertically extending first spindle means journaled for rotation on the plow and carrying at its lower end a rear furrow wheel, means connected to said spindle and responsive to said relative turning movement to steer said rear furrow wheel, a unit planter carrier drawn behind said plow, generally vertically extending second spindle means journaled for rotation on said carrier and carrying wheel track forming means, link means interconnecting said first and second spindle means in such a manner that when the first spindle means is rotated in response to turning movement, the second spindle means will be rotated in a like manner, and means interconnecting the plow and the carrier to maintain a proper spaced apart relation between said first and second spindle means.

10. In combination: a wheel track planter carrying unit and a planter mounted on said unit, said wheel track planter carrying unit including means to form a ridge in freshly worked soil, at least the central portion of the ridge being at an elevation above the normal surface of the freshly worked soil, track forming wheel means to compact the soil in the central portion of the ridge until it is no longer above the normal surface of the freshly worked soil, said planter including furrow opener means to open a furrow within the compacted soil, seed dispensing means adapted to place seed within the opened furrow, and press wheel means adapted to press the soil about said furrow.

11. The invention set forth in claim 10 in which furrow filling means are disposed between the seed dispensing means and the press wheel means whereby soil is placed over the furrow in advance of the press wheel means.

12. The invention set forth in claim 10 in which herbicide dispensing means are disposed to the rear of the press wheel means.

References Cited
UNITED STATES PATENTS

| | | | |
|---|---|---|---|
| 1,371,012 | 3/1921 | Williams | 111—14 |
| 3,204,588 | 9/1965 | Johnson | 111—85 |
| 1,837,526 | 12/1931 | Botsford | 172—310 X |
| 2,611,331 | 9/1952 | O'Neil | 111—85 X |
| 2,869,895 | 1/1959 | Tkachyk et al. | 172—282 X |
| 2,919,665 | 1/1960 | Bredeson | 111—67 |
| 2,930,335 | 3/1960 | Hage | 111—52 |
| 2,980,443 | 4/1961 | Fina | 280—419 X |
| 3,037,470 | 6/1962 | Watson et al. | 111—52 X |
| 3,061,020 | 10/1962 | Mannheim | 172—417 X |

ABRAHAM G. STONE, *Primary Examiner.*

J. R. OAKS, *Assistant Examiner.*